United States Patent
Kellner et al.

(10) Patent No.: US 12,115,758 B2
(45) Date of Patent: Oct. 15, 2024

(54) WOOD-PLASTIC HYBRID COMPONENT FOR USE IN A MOTOR VEHICLE

(71) Applicant: Dr. Ing. h.c. F. Porsche Aktiengesellschaft, Stuttgart (DE)

(72) Inventors: Philipp Kellner, Renningen (DE); Scally Rommelfanger, Bad Liebenzell (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 170 days.

(21) Appl. No.: 17/747,092

(22) Filed: May 18, 2022

(65) Prior Publication Data

US 2022/0396003 A1   Dec. 15, 2022

(30) Foreign Application Priority Data

Jun. 15, 2021   (DE) .................. 10 2021 115 422.7

(51) Int. Cl.
| | |
|---|---|
| B32B 21/08 | (2006.01) |
| B27N 5/00 | (2006.01) |
| B27N 7/00 | (2006.01) |
| B29C 45/00 | (2006.01) |
| B29C 45/14 | (2006.01) |
| B62D 29/02 | (2006.01) |
| B29L 31/30 | (2006.01) |

(52) U.S. Cl.
CPC ............... *B32B 21/08* (2013.01); *B27N 5/00* (2013.01); *B27N 7/005* (2013.01); *B29C 45/0005* (2013.01); *B29C 45/14311* (2013.01); *B62D 29/02* (2013.01); *B29L 2031/3005* (2013.01)

(58) Field of Classification Search
None
See application file for complete search history.

(56) References Cited

U.S. PATENT DOCUMENTS

| | | | |
|---|---|---|---|
| 9,434,421 B1 * | 9/2016 | Lu ........................... | B62D 29/02 |
| 10,603,872 B2 | 3/2020 | Gruhn et al. | |
| 2002/0062545 A1 * | 5/2002 | Niedermair ............... | E04C 3/14 |
| | | | 427/355 |
| 2003/0125458 A1 * | 7/2003 | Thiele .................... | B27N 3/005 |
| | | | 524/733 |

FOREIGN PATENT DOCUMENTS

| | | | |
|---|---|---|---|
| CN | 106193516 A | * | 12/2016 |
| EP | 2759580 A1 | | 7/2014 |
| EP | 3778163 A1 | | 2/2021 |

OTHER PUBLICATIONS

Chen, H., Wood Plastic Board, Dec. 7, 2016, machine translation of CN 106193516 (Year: 2016).*

* cited by examiner

*Primary Examiner* — Chinessa T. Golden
(74) *Attorney, Agent, or Firm* — Buchanan Ingersoll & Rooney PC

(57) ABSTRACT

Wood-plastic hybrid component for use in a motor vehicle having a multi-component structure including a wood subsection, at least one water-impermeable plastic coating, arranged directly on the wood subsection for protecting the wood subsection, and a plastic subsection. The water-impermeable plastic coating is at least partially directly adjacent to the plastic subsection.

20 Claims, 4 Drawing Sheets

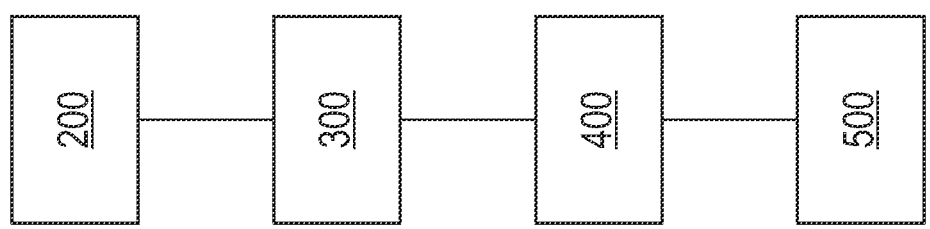

WOOD-PLASTIC HYBRID COMPONENT FOR USE IN A MOTOR VEHICLE

CROSS-REFERENCE TO RELATED APPLICATION

This application claims priority to German Patent Application No. 10 2021 115 422.7, filed Jun. 15, 2021, the content of such application being incorporated by reference herein in its entirety.

FIELD OF THE INVENTION

The present invention relates to a wood-plastic hybrid component for use in a motor vehicle, to a motor vehicle having such a wood-plastic hybrid component, and to a method for producing a wood-plastic hybrid component.

SUMMARY OF THE INVENTION

Wood-plastic hybrid components for use in a motor vehicle are known from the prior art. However, such components have only limited suitability for use in highly stressed areas, in particular are not suitable for use in external areas. Thus, in the case of use in highly stressed areas, the wood of the wood-plastic hybrid components is particularly susceptible to aging and wear phenomena, such as scratches or the like. When the components are used in external areas, the wood is also particularly susceptible to moisture, it being possible for the wood to swell, degrade or change its color due to the moisture, which has a disadvantageous effect on the quality, dimensional accuracy, mechanical properties and external appearance of the wood-plastic hybrid components. It is true that the prior art includes measures for making such wood-plastic hybrid components more robust and more resistant to moisture and high mechanical stress by completely encapsulating the wood parts with a plastic layer, but encapsulating the entire surface of the wood parts has proven to be disadvantageous for weight reasons, particularly on account of the production-related minimum thickness of the plastic layer.

Described herein is a wood-plastic hybrid component for use in a motor vehicle which can be produced in a simple and low-cost manner and which is suitable for use in highly stressed areas, especially areas subject to moisture-related stresses, and at the same time has a minimum weight.

Further features and details of the invention will become apparent from the dependent claims, the description and the drawings. Here, features and details which are described in connection with the wood-plastic hybrid component according to aspects of the invention also apply, of course, in connection with the motor vehicle according to aspects of the invention and the method according to aspects of the invention and vice versa in each case, and therefore reciprocal reference is or may always be made in respect of the disclosure relating to the individual aspects of the invention.

According to the invention, a wood-plastic hybrid component for use in a motor vehicle is provided. In this case, the wood-plastic hybrid component according to aspects of the invention has a multi-component structure, comprising a wood subsection, at least one water-impermeable plastic coating, arranged directly on the wood subsection, for protecting the wood subsection, and a plastic subsection. According to the invention, provision is made here for the water-impermeable plastic coating to be at least partially directly adjacent to the plastic subsection.

According to the invention, therefore, the wood-plastic hybrid component is designed to be arranged even in, for example, mechanically highly stressed areas or in an external area of a vehicle. In contrast to the known wood-plastic hybrid components, this capability is achieved, in particular, while maintaining lightweight construction. The mode of operation of the wood-plastic hybrid component according to the invention, in particular the interaction of the individual components, is explained in greater detail below.

By introducing a water-impermeable coating into the wood-plastic hybrid component, in particular by applying the coating to the wood subsection of the wood-plastic hybrid component, with the coating being at least partially directly adjacent to the plastic subsection, it is possible, in particular, to enable particularly effective protection of the wood surface of the wood-plastic hybrid component, which protects the wood subsection from severe mechanical and moisture-related stresses but, at the same time, can be applied thinly in order to satisfy lightweight construction requirements.

In the context of the invention, a wood-plastic hybrid component can be understood to mean, in particular, a material which is composed of individual wood parts or wood layers or wood subsections and also plastic parts or plastic layers or plastic subsections. In a wood-plastic hybrid component, the layers or parts of plastic and wood which can be distinguished from one another are preferably connected to one another by material bonding. In the context of the invention, a multi-component structure can furthermore be understood to mean a structure with a plurality of successive layers or subsections which can be distinguished from one another and which can preferably be connected to one another by material bonding. According to the invention, a plastic subsection or a wood subsection can be understood to mean, in particular, a subregion of a plastic part or of a plastic layer or a subregion of a wood part or of a wood layer. According to the invention, location of the water-impermeable plastic coating at least partially directly adjacent to the plastic subsection can be understood to mean, in particular, that the water-impermeable plastic coating is arranged directly adjacent to the plastic subsection, at least in a subregion. It is possible, in particular, for these directly adjacent regions to be arranged in boundary regions between the wood subsection and the plastic subsection, thereby, in particular, effecting better moisture protection of the wood subsection. In this case, concrete provision can preferably be made for the water-impermeable plastic coating to be adjacent to the plastic subsection in such a way that the two layers are connected to one another by material bonding or at least in a sealing manner. It is likewise advantageous if the water-impermeable plastic coating is connected to the wood subsection by material bonding. It is also self-evident that the water-impermeable layer arranged directly on the wood subsection may also be arranged only partially, i.e. in subregions of a surface of the wood subsection.

Within the scope of the present invention, provision can be made for the wood subsection to be at least partially directly connected to a plastic subsection.

Likewise, provision can advantageously be made for the water-impermeable plastic coating to be connected to the plastic subsection by material bonding and in a water-tight manner.

Moreover, it has proven to be advantageous if the wood-plastic hybrid component has at least one single-layered section, in which the plastic subsection has no direct connection to the wood subsection or the water-impermeable plastic coating.

It is likewise advantageous if the wood-plastic hybrid component has at least one two-layered section, in which only the wood subsection and the water-impermeable plastic coating arranged directly on the wood subsection are present and neither the wood subsection nor the water-impermeable plastic coating have a direct connection to the plastic subsection.

It is furthermore conceivable that the wood-plastic hybrid component has at least one three-layered section, in which the plastic subsection and the wood subsection and the water-impermeable plastic coating are present, and the plastic subsection, the wood subsection and the water-impermeable plastic coating are preferably arranged at least partially directly on one another.

It can furthermore be advantageous if the wood-plastic hybrid component has at least one three-layered section, which comprises the wood subsection and, on two opposite surfaces of the wood subsection, a water-impermeable plastic coating.

It is likewise conceivable that the wood-plastic hybrid component has at least one four-layered section, which comprises the wood subsection, a water-impermeable plastic coating on two opposite surfaces of the wood subsection, and additionally, on at least one side, the plastic subsection.

Within the scope of the present invention, provision can also be made for the plastic subsection to be in the form of a fiber-reinforced, preferably a short fiber-reinforced or long fiber-reinforced, plastic.

Such a fiber-reinforced plastic subsection is particularly suitable for stable, robust and, in particular, shock-resistant designs of a wood-plastic hybrid component. The fiber-reinforced plastics simultaneously combine a stable and at least partially weight-optimized structure. The reinforcing fibers are preferably glass, aramid and/or carbon fibers. In this case, the reinforcing fibers can preferably be in the form of continuous fibers. These can be arranged unidirectionally, bidirectionally or quasiisotropically, for example.

With a view to particularly simple, fast and low-cost production even of relatively complex structures, it can furthermore have advantages if the plastic subsection of the wood-plastic hybrid component is in the form of an injection molded plastic layer. By means of an injection molding method, it is possible here, in particular, to produce complex hybrid components which have undercuts or the like.

It also has advantages if the water-impermeable plastic coating and/or the plastic subsection are/is in the form of a thermoplastic and/or thermosetting plastic and/or a biopolymer, wherein the water-impermeable plastic coating and/or the plastic subsection are preferably in the form of a similar material, in particular of the same material.

Thermoplastics are suitable here particularly because they are simple to process. Thermosetting plastics, on the other hand, offer stable structures after a manufacturing process, even when used at high temperatures. In contrast to synthetic polymers, biopolymers are advantageous from an environmental point of view. Design of the water-impermeable plastic coating and of the plastic subsection in the form of similar or identical materials is expedient particularly with a view to a stable, material connection of the materials. In this context, similar materials can be understood to mean, in particular, materials of the same group of substances.

With a view to simple, fast and low-cost production of a wood-plastic hybrid component, there are also advantages if the wood subsection is a layer of a single- or multi-part or single- or multi-layer wood semifinished product, wherein the wood subsection is preferably formed from one of the following types of wood:

beech,
oak,
spruce,
fir,
bamboo.

The use of a wood semifinished product in this context makes possible, in particular, rapid processing or further processing to form a hybrid component, in that the plastic part of the wood-plastic hybrid component can be integrally formed on the wood semifinished product, e.g. by means of a simple joining or shaping process.

Further advantages are obtained if the wood subsection is coated on at least one side with the water-impermeable plastic coating, preferably is coated on at least one side with the water-impermeable plastic coating over its entire surface, and in particular is coated on more than one side with the water-impermeable plastic coating over its entire surface. In this context, one-sided coating is understood to mean at least partial coating of a side or surface of the wood subsection or of a part surrounding the wood subsection. Coating of the wood subsection with the water-impermeable plastic coating should advantageously be present wherever the wood subsection comes or may come into contact with moisture or other high-stress media. In the context of reliable protection and stable connection, the entire surface of the wood subsection of the wood-plastic hybrid component can preferably be coated with the water-impermeable plastic coating.

It is also concretely conceivable, with a view to as light a construction as possible, for the layer thickness of the water-impermeable plastic coating to be at most $\frac{1}{3}$ of the layer thickness of the wood subsection and/or of the plastic subsection, preferably at most $\frac{1}{4}$, in particular at most $\frac{1}{5}$ of the layer thickness of the wood subsection and/or of the plastic subsection.

In the context of a structurally simple form of application of the water-impermeable plastic coating, it may furthermore be advantageous if the water-impermeable plastic coating is in the form of a plastic film or a plastic varnish. In this case, a plastic film can, for example, be printed on, laminated on or pressed on. A plastic varnish can furthermore be brushed on, sprayed on, rolled on or applied by means of an immersion process, for example.

The invention likewise also relates to a motor vehicle having at least one above-described wood-plastic hybrid component. Thus, the motor vehicle according to aspects of the invention provides the same advantages as those already described in detail with reference to the wood-plastic hybrid component according to the invention. Such a motor vehicle preferably has a plurality of wood-plastic hybrid components according to the invention.

The invention likewise furthermore relates to a method for producing a wood-plastic hybrid component, in particular a wood-plastic hybrid component described above. In this case, the method according to aspects of the invention comprises the steps of applying a water-impermeable plastic coating to a wood subsection of a wood semifinished product, inserting the wood semifinished product into a shaping tool, closing the shaping tool and carrying out a shaping process, and also opening the shaping tool and removing the wood-plastic hybrid component. Thus, the method according to aspects of the invention also provides the advantages already described with reference to the wood-plastic hybrid component according to aspects of the invention and the motor vehicle according to the invention. The steps of the method according to aspects of the invention can in this case be carried out at least partially automatically, e.g. under sensor control. It is likewise conceivable that individual, several or all steps of the method according to aspects of the invention can be implemented by means of a computer.

With a view to a rapid and effective shaping method, it is conceivable, in particular, that the shaping tool is designed as an injection molding tool and the shaping process is designed as an injection molding process, or the shaping tool is designed as a pressing tool and the shaping process is designed as a pressing process. In the context of a pressing process, provision can furthermore be made, before closing the pressing tool and carrying out the pressing process, for a pressable plastic semifinished product to be inserted along with the wood semifinished product, wherein the plastic semifinished product is preferably in the form of a glass mat-reinforced thermoplastic (GMT) or a sheet molding compound (SMC) and, in particular, is heated beforehand in order to ensure flowability.

Further advantages, features and details of the invention will be found in the following description, in which exemplary embodiments of the invention are described in detail with reference to the drawings. In this context, the features mentioned in the claims and in the description may each be essential to the invention individually or in any desired combination.

BRIEF DESCRIPTION OF THE DRAWINGS

The figures are schematic and

FIG. 4 shows individual steps of the method according to aspects of the invention for producing a wood-plastic hybrid component.

DETAILED DESCRIPTION OF THE INVENTION

Figure 1B:
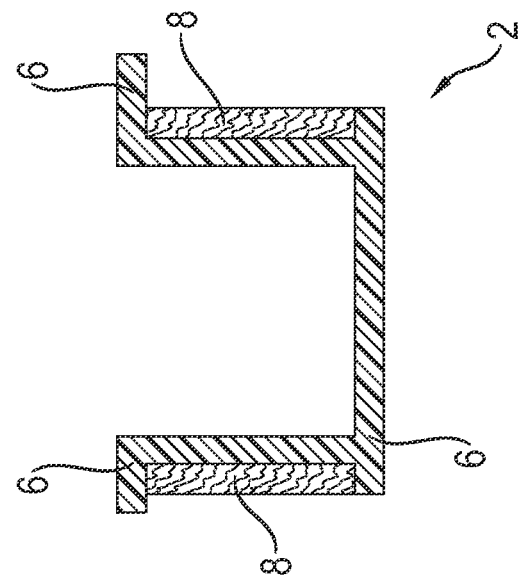
FIG. 1b shows a wood-plastic hybrid component as per FIG. 1a in a sectional illustration according to a section along section line I-I.
Figure 1A:
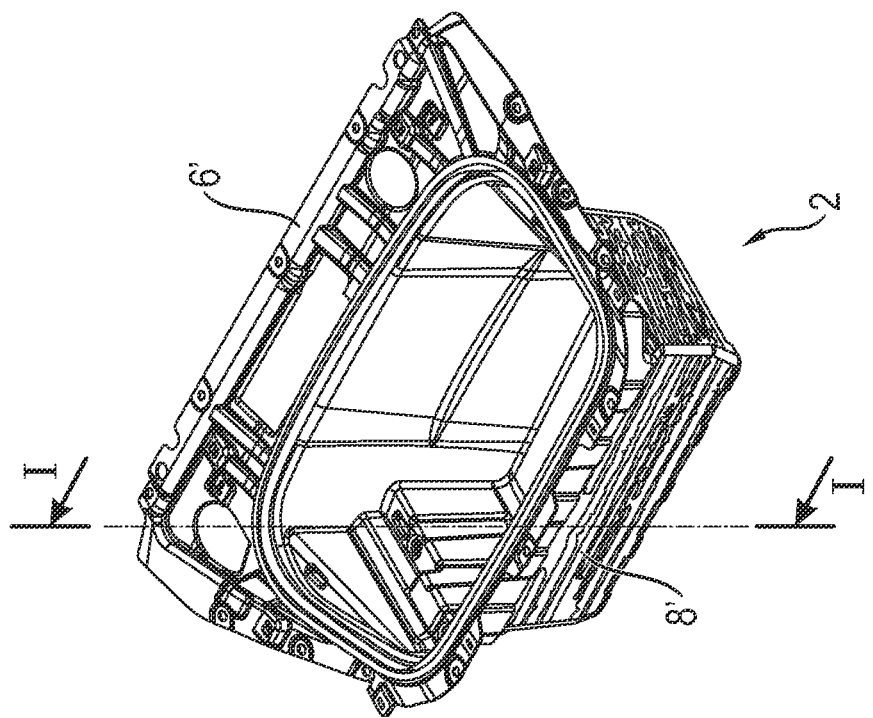
FIG. 1a shows a wood-plastic hybrid component for use in a motor vehicle without a water-impermeable plastic coating for protecting a wood subsection in a perspective view.

FIG. 1a shows a wood-plastic hybrid component 2 for use in a motor vehicle 100 without a water-impermeable plastic coating 10 for protecting a wood subsection 8, in a perspective view.

As can be seen from FIG. 1a, a plurality of wood semifinished products 8' is arranged on an outer side of the plastic part 6', said semifinished products being connected by material bonding to the plastic part 6' in the present case.

FIG. 1b shows a wood-plastic hybrid component 2 as per FIG. 1a in a sectional illustration according to a section along section line I-I.

As can be seen from FIG. 1b, a wood subsection 8 of the wood semifinished product 8' is in each case connected directly to the plastic subsection 6 of the plastic part 6' on both sides of the plastic part 6'.

Figure 2B:
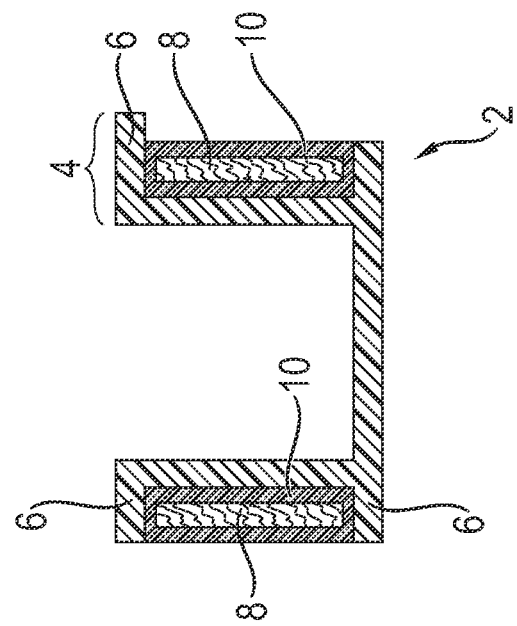
FIG. 2b shows a wood-plastic hybrid component according to aspects of the invention as per FIG. 2a in a sectional illustration according to a section along section line II-II.
Figure 2A:
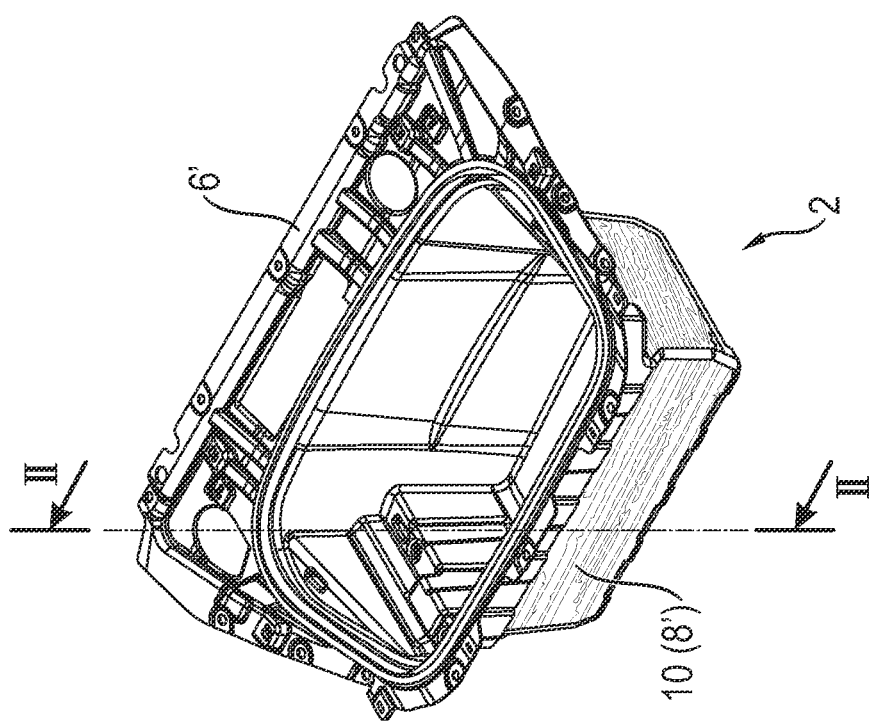
FIG. 2a shows a wood-plastic hybrid component according to aspects of the invention for use in a motor vehicle, having a water-impermeable plastic coating for protecting the wood subsection in a perspective view, in accordance with a first exemplary embodiment.

FIG. 2a shows a wood-plastic hybrid component 2 according to aspects of the invention for use in a motor vehicle 100, having a water-impermeable plastic coating 10 for protecting a wood subsection 8 in a perspective view, in accordance with a first exemplary embodiment.

As can be seen from FIG. 2a, a plurality of wood semifinished products 8' is arranged on an outer side of the plastic part 6', said semifinished products being arranged on the plastic part 6' and each being completely coated with a water-impermeable plastic coating 10. In this case, the water-impermeable plastic coating 10 is also at least partially adjacent to the plastic part 6' or the plastic subsection 6.

FIG. 2b shows a wood-plastic hybrid component according to aspects of the invention as per FIG. 2a in a sectional illustration according to a section along section line II-II.

As can be seen from FIG. 2b, the wood-plastic hybrid component has a multi-component structure 4, comprising a wood subsection 8, at least one water-impermeable plastic coating 10, arranged directly on the wood subsection 8, for protecting the wood subsection 8, and a plastic subsection 6, wherein the water-impermeable plastic coating 10 is at least partially directly adjacent to the plastic subsection 6. Here, the wood subsection 8 of the wood semifinished product 8' is coated over its entire surface with a water-impermeable plastic coating 10 on both sides of the plastic part 6' and is connected to the plastic subsection 6 via the water-impermeable plastic coating 10.

Figure 3A:
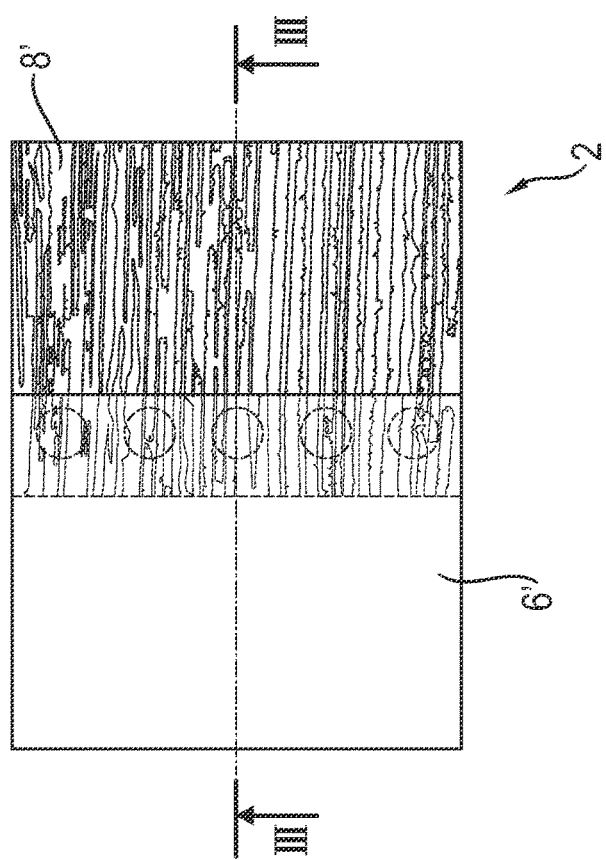
FIG. 3a shows a wood-plastic hybrid component according to aspects of the invention in a plan view, in accordance with another exemplary embodiment.

FIG. 3a shows a wood-plastic hybrid component 2 according to aspects of the invention in a plan view, in accordance with another exemplary embodiment.

As can be seen from FIG. 3a, the wood semifinished product 8' is at least partially surrounded by the plastic part 6', which is connected thereto by material bonding.

Figure 3B:
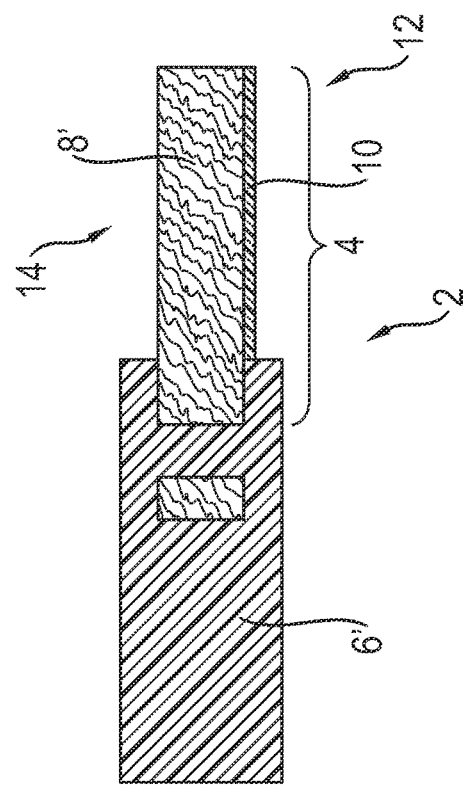
FIG. 3b shows the wood-plastic hybrid component according to aspects of the invention as per FIG. 3a in a sectional illustration according to a section along section line III-III.

FIG. 3b shows the wood-plastic hybrid component according to aspects of the invention as per FIG. 3a in a sectional illustration according to a section along section line III-III.

As can be seen from FIG. 3b, the wood semifinished product 8' is firmly incorporated into the plastic part 6'. On an outer side 12, the wood semifinished product 8' is furthermore coated with a water-impermeable plastic coating 10 in order to protect the wood semifinished product 8' or the wood subsection 8 from the influence of moisture. On the other hand, there is no water-impermeable plastic coating 10 on an inner side 14, on which the wood-plastic hybrid component 2 is not exposed to moisture.

FIG. 4 shows individual steps of the method according to aspects of the invention for producing a wood-plastic hybrid component. In this case, the method according to aspects of the invention comprises the steps of applying 200 a water-impermeable plastic coating 10 to a wood subsection 8 of a wood semifinished product 8', inserting 300 the wood semifinished product 8' into a shaping tool, closing 400 the shaping tool and carrying out a shaping process, and also opening 500 the shaping tool and removing the wood-plastic hybrid component 2.

The above explanation of the embodiments describes the present invention exclusively in the context of examples. It is self-evident that individual features of the embodiments can be freely combined with one another, insofar as this is technically expedient, without exceeding the scope of the present invention.

What is claimed is:

1. A vehicle component comprising:
a multi-component structure including (i) a plastic subsection in the form of a hollow body, (ii) a wood subsection surrounding at least a portion of the plastic subsection and forming sidewalls of the hollow body, and (ii)(iii) at least one water-impermeable plastic coating arranged directly on the wood subsection for protecting the wood subsection,
wherein the water-impermeable plastic coating is at least partially directly adjacent to the plastic subsection.

2. The vehicle component as claimed in claim 1, wherein the wood subsection is at least partially directly connected to the plastic subsection.

3. The vehicle component as claimed in claim 1, wherein the water-impermeable plastic coating is connected to the plastic subsection by material bonding and in a water-tight manner.

4. The vehicle component as claimed in claim 1, wherein the wood-plastic hybrid component has at least one single-layered section, in which the plastic subsection has no direct connection to the wood subsection or the water-impermeable plastic coating.

5. The vehicle component as claimed in claim 1, wherein the wood-plastic hybrid component has at least one two-layered section including only the wood subsection and the water-impermeable plastic coating that is arranged directly on the wood subsection, wherein neither the wood subsection nor the water-impermeable plastic coating have a direct connection to the plastic subsection.

6. The vehicle component as claimed in claim 1, wherein the wood-plastic hybrid component has at least one three-layered section including the plastic subsection, the wood subsection and the water-impermeable plastic coating that are arranged at least partially directly on one another.

7. The vehicle component as claimed in claim 1, wherein the wood-plastic hybrid component has at least one three-layered section including the wood subsection and a water-impermeable plastic coating on two opposite surfaces of the wood subsection.

8. The vehicle component as claimed in claim 1, wherein the wood-plastic hybrid component has at least one four-layered section including the wood subsection, a water-impermeable plastic coating on two opposite surfaces of the wood subsection, and the plastic subsection on at least one side of the wood subsection.

9. The vehicle component as claimed in claim 1, wherein the plastic subsection is a fiber-reinforced plastic.

10. The vehicle component as claimed in claim 1, wherein the plastic subsection is an injection molded plastic layer.

11. The vehicle component as claimed in claim 1,
wherein the water-impermeable plastic coating and/or the plastic subsection are/is a thermoplastic and/or thermosetting plastic and/or a biopolymer, and
wherein the water-impermeable plastic coating and/or the plastic subsection are composed of the same material.

12. The vehicle component as claimed in claim 1, wherein the wood subsection is a layer or part of a single- or multi-part or single- or multi-layer wood semifinished product, and wherein the wood subsection is formed from one of the following types of wood:
beech,
oak,
spruce,
fir, and
bamboo.

13. The vehicle component as claimed in claim 1, wherein the wood subsection (i) is coated on at least one side with the water-impermeable plastic coating, (ii) is coated over an entire surface of the at least one side with the water-impermeable plastic coating, or (iii) is coated over an entire surface of more than one side with the water-impermeable plastic coating.

14. The vehicle component as claimed in claim 1, wherein a layer thickness of the water-impermeable plastic coating is at most one-third of the layer thickness of the wood subsection and/or of the plastic subsection.

15. The vehicle component as claimed in claim 1, wherein the water-impermeable plastic coating is a plastic film or a plastic varnish.

16. A motor vehicle having the vehicle component as claimed in claim 1.

17. The vehicle component as claimed in claim 1, wherein the hollow body includes opposing sides, wherein each side includes two protruding flanges, and
wherein for each side of the opposing sides, the wood subsection is positioned between the two protruding flanges.

18. The vehicle component as claimed in claim 17, wherein a top-mounted flange of the two protruding flanges extends further outward from the wood subsection than a bottom-mounted flange of the two protruding flanges.

19. The vehicle component as claimed in claim 1, wherein the hollow body comprises an open-ended box.

20. The vehicle component as claimed in claim 1, wherein the wood subsection is not positioned within the hollow body.

* * * * *